March 8, 1927.
M. BONTEMPI
COFFEEPOT
Filed Dec. 5, 1924
1,619,967
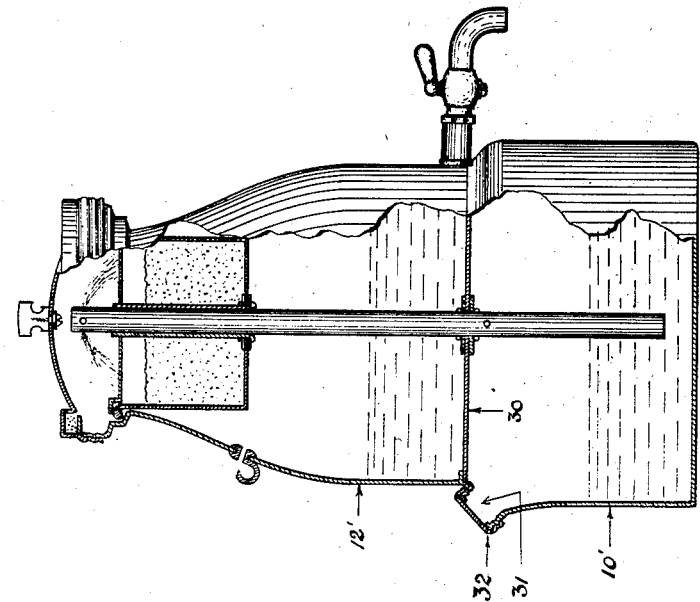
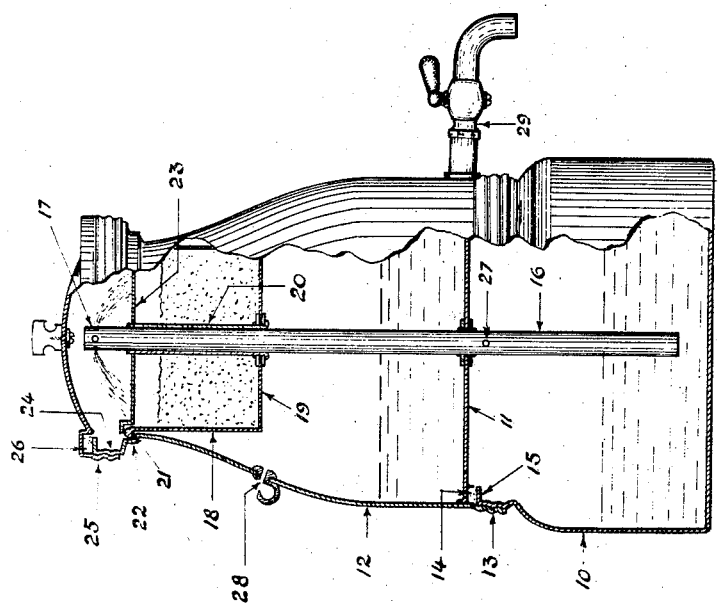
Inventor
Mario Bontempi
By his Attorney Patented Mar. 8, 1927.

1,619,967

UNITED STATES PATENT OFFICE.

MARIO BONTEMPI, OF NEW YORK, N. Y.

COFFEEPOT.

Application filed December 5, 1924. Serial No. 754,042.

This invention relates to coffee percolators, and more particularly contemplates the production of a device by means of which coffee of a superior fragrance and aroma may be obtained in a relatively short time.

The primary object of this invention is to provide a coffee percolator of a novel and improved design, constructed in a manner calculated to fully preserve the original aroma of the coffee in the beverage produced.

Another object of this invention is to produce a percolator for making coffee, constructed in such a manner that the volatile oils which distill from the coffee during the course of the operation are prevented from escaping; consequently permitting the production of full flavored coffee by the use of a smaller quantity of ground coffee bean than is usually required by other types of percolators heretofore in use.

A further object is to provide a percolator of the type where hot water is forced through the ground coffee by the pressure of vapor generated in a closed boiler, where the beverage produced may be retained into a suitable receptacle, to be poured as needed.

Other objects and advantages of the present invention will more fully appear as the description proceeds, and will be set forth in the appended claims.

My improved device employs a principle which is entirely different from that governing the operation of percolators of the ordinary type. In these, water in the form of vapor is directed and condensed above a receptacle containing ground coffee, and the resulting hot water, together with the water particles carried off by the steam, is allowed to percolate through. Percolators of this type are generally provided with a cover which is merely placed on top of the coffee receptacle, and which may be easily removed and replaced.

When the operation is started, the water vapor strikes against the cold surface of the cover, and becomes condensed, percolating through the ground coffee into the underlying receptacle. After a while, however, the cover becomes warm, the vapor does not condense as rapidly, and the uncondensed part escapes into the air from underneath the cover, carrying with it some of the volatile oils to which the fragrance of coffee is due.

In some cases the coffee infusion falls right back into the water boiler, and is subjected to the same process over and over again; and when this is done the beverage produced is of a decidedly inferior quality, acquiring a flat taste which is entirely foreign to real coffee aroma.

When the infusion is collected in a special receptacle after having passed through the ground coffee only once, the result is better than in the preceding case, but the flavoring oils and essences carried off by the steam still prevent the coffee from acquiring the true and full coffee fragrance. Furthermore, in both cases a relatively large quantity of ground coffee is needed in order to produce a beverage of suitable strength.

In a patent entitled "Express coffeepot", granted to me on March 25, 1924, Serial No. 1,488,089, I have described a coffee percolator of a special construction, whereby the full aroma of the coffee is preserved, by preventing the escape of steam and of the volatile products.

The said device consists, essentially, of a tightly closed boiler, on top of which is placed a receptacle for ground coffee, which is also tightly closed. A central vertical tube projects through the bottom of the receptacle, its upper end extending to the upper portion of the receptacle, and its lower end almost reaching the bottom of the boiler. The coffee receptacle is provided with an outlet at or near its bottom, providing a permanently open passage through which the coffee infusion may flow as it is produced. The device is operated by the pressure of the vapor produced in the boiler, which will force hot water through the central tube to overflow over the ground coffee.

A very good and full flavored beverage is obtained, owing to the fact that only boiling hot water reaches the ground coffee, this being conducive to a good infusion; also, owing to the fact that steam cannot possibly escape until the water in the boiler reaches the lower end of the central tube, when the feeding of water through the tube will practically cease, and steam will finally pass through the ground coffee, escaping through the outlet.

Coffee produced in this manner is all that can be desired; but the device mentioned is open to certain improvements, which constitute the essence of the present invention.

In the first place, a separate receptacle is needed to collect the coffee, unless the beverage is poured directly into the cups for use. If this is done, however, the coffee produced during the initial stages of the operation is bound to be much stronger than the coffee produced afterwards, and the coffee produced at the end may be entirely too weak.

On the other hand, if all the coffee produced is collected and mixed in a separate receptacle before being poured into cups, this means that the apparatus is not self-contained, and also implies the necessity of consuming the coffee within a short time, to prevent its getting cold.

Another feature of the device is, that while the pressure exerted by the steam is utilized in order to force the hot water upwardly, when the water overflows and falls on the ground coffee, it will percolate through solely by gravity, unless all the space above the ground coffee is filled with water; in this case, of course, the pressure of the steam would be transmitted to this water, which would percolate through the coffee at a greater speed.

In practice, however, this never happens, and therefore the speed at which coffee percolates is not much greater than that obtained in a percolator of ordinary design.

I have found that in practice it is desirable, for a device of this kind, to satisfy two conditions, besides the main requirement of producing good coffee. One of these conditions, when coffee is produced to be consumed at the end of a meal, is the possibility of starting the device in operation when the meal is progressing, the coffee which is gradually produced being collected within the device, ready for immediate use when needed, without entailing unnecessary delay. The other condition, which is especially important when the device is used for preparing coffee for immediate use, is the ability of the device to give quick results, by being so designed that the water will rapidly percolate through the ground coffee. This is also important when coffee is prepared frequently, or in considerable quantity.

The device forming the object of the present invention, partakes of all the advantages of my previous device, by delivering coffee which is prepared by passing hot steaming water only once through the ground coffee, and by preventing the escape of volatile flavoring matter together with the steam. At the same time the device, illustrated in the annexed drawings, also fulfills the conditions which I have just pointed out.

Furthermore, the construction of the device is also simplified in regard to the features insuring tightness of the boiler and preventing the premature escape of steam.

In the drawings:

Fig. 1 is a side view in elevation, partly sectioned and broken away, of a device embodying my invention, made with a detachable boiler; and, Fig. 2 is a similar view of a similar device, of a somewhat less expensive construction.

Referring to Fig. 1, 10 designates a boiler open at the top, but closed when the device is assembled by the bottom 11 of the infusion receptacle 12. This receptacle is formed with a threaded body extension 13, which is screwed on the top of boiler 10, and a suitable packing 14 is inserted between the flanged top 15 of the boiler and the bottom of receptacle 12.

A central vertical tube 16 is secured to bottom 11 of receptacle 12 in any suitable manner. The lower end of said tube extends to a point at a short distance from the bottom of the boiler, and the upper end extends all the way through the receptacle to its top. Said upper end is preferably closed, and provided with side perforations at the top, as shown at 17. 18 designates a container for ground coffee, having a finely perforated bottom 19 serving as a filter for the coffee infusion, and insertable over tube 16, preferably by means of a central tubular member 20 which provides a convenient means for handling the container when being placed in position, or removed therefrom. The upper edge of said container is formed with a flange 21, which rests on a shoulder portion 22 provided in receptacle 12, and a perforated disc 23 is inserted over tubular member 20 and over said flange, forming a perforated cover for said container.

Both the container and the disc are mounted so as to remain at a point lower than the upper end of tube 16.

The upper end of receptacle 12 is threaded at 24, to receive a cover 25, and the tightness of this arrangement is assured by a packing 26 inserted between the top of the receptacle and the cover.

At a point external to and close to bottom 11, tube 16 is provided with a small opening 27. Through the wall of receptacle 12, at a point above the level to be reached by the coffee infusion, I provide an outlet 28 for the steam, said outlet being preferably provided with a whistle, or being of such a form that the steam will produce a whistling sound upon escaping. Said receptacle is also provided with a faucet 29 at a point close to its bottom, through which the prepared coffee may be poured.

To start its operation, the device is disassembled, and the desired quantity of water is poured into the boiler, according to the quantity of coffee to be produced.

The water which will thus be used is the part above the lower end of tube 16, the remaining part being left in the boiler to prevent its becoming dry. The boiler, however, is never filled up to its top, but an air chamber is left where steam can collect and create a pressure.

The empty receptacle 12 is then placed on top of the boiler, and container 18 is filled with a suitable amount of ground coffee; the container is then placed in position, disc 23 is inserted above it, and the cover is tightly screwed on to the receptacle.

The water in the boiler is then heated, and the steam initially formed escapes through opening 27 into the chamber above the coffee container. When the water is boiling, and steam is produced in abundance, only a small part of the steam may escape through opening 27, and the rest will gradually create a pressure which forces the hot water through the tube and through openings 17. Disc 23 acts as a distributor for the ensuing spray of water, and the water will collect on top of the ground coffee and will gradually percolate.

The steam escaping through opening 27, however, will also create a pressure in the chamber above the coffee container, and this pressure will force the water to percolate quickly through the coffee and through the bottom of the container. The infusion thus produced collects at the lower part of the receptacle, as shown, and steam will only escape when all the water has been forced through the ground coffee, and the aromatic substances have already been dissolved. When steam begins to issue from outlet 28, a whistling sound will be produced, which will serve as a signal to turn off the heat, the operation being completed.

The coffee is then ready to be poured whenever convenient through faucet 29.

If desired, a packing may also be inserted between flange 21 and shoulder 22, although in practice I have found this to be unnecessary, owing to the pressure exerted by the steam against the ground coffee, which holds the container snugly in place.

Fig. 2 illustrates a similar device, of a somewhat simpler construction, in which the coffee receptacle, 12', is permanently attached to the boiler 10', being welded or otherwise secured to the boiler top 30, as shown, or being produced in one piece with said boiler. The boiler may be filled or emptied through an inlet 31, which may be tightly closed by means of a cap 32. Otherwise the construction and operation of the device is similar to that described in connection with Fig. 1.

It will be observed, that the construction of my device is extremely simple, lending itself very readily to mass production methods. The type shown in Fig. 1 permits easier inspection and cleaning of the various parts, and the type shown in Fig. 2 can be produced at a somewhat lower cost. Both types may be made of sheet metal by blanking and forming processes at a comparatively small cost.

It is obvious that my invention may be carried into practice in ways different from those shown, especially in so far as the design and appearance of the device is concerned. While the device shown is not entirely self-contained, having to be placed on top of a stove for its operation, its design may be modified to embody a gas burner, or an electrical resistance, ready for connection to a suitable source of supply, without departing from the spirit and scope of my invention.

I therefore reserve myself the right to produce devices embodying my invention, in any way or manner which may enter, fairly, into the scope of the appended claims.

I claim:

1. In a device of the class described, the combination of a tightly closed boiler, a tightly closed receptacle associated therewith, a percolating container for flavoring material mounted within said receptacle, a tubular member leading from the lower part of said boiler to the upper part of said receptacle above said percolating container, a faucet controlled outlet for the liquid collected in said receptacle, a steam outlet through the walls of said receptacle at the delivery side of said container, and a relatively small opening through the wall of said tubular member at a point within said boiler close to the top of said boiler.

2. In a device of the class described, the combination of a tightly closed boiler, a receptacle mounted at the top thereof, a percolating container for flavoring material mounted within said receptacle at the upper part thereof, a tubular member leading from the lower part of said boiler to a point within said receptacle above said percolating container, a faucet controlled outlet for the liquid collected in said receptacle, a steam outlet through the walls of said receptacle at the delivery side of said container, a relatively small opening through the wall of said tubular member at a point within said boiler close to the top of said boiler, and means for hermetically sealing the top part of said receptacle.

MARIO BONTEMPI.